Feb. 11, 1947. W. F. GRESHAM 2,415,686
BABY BUGGY AND THE LIKE
Filed June 2, 1945 2 Sheets-Sheet 1
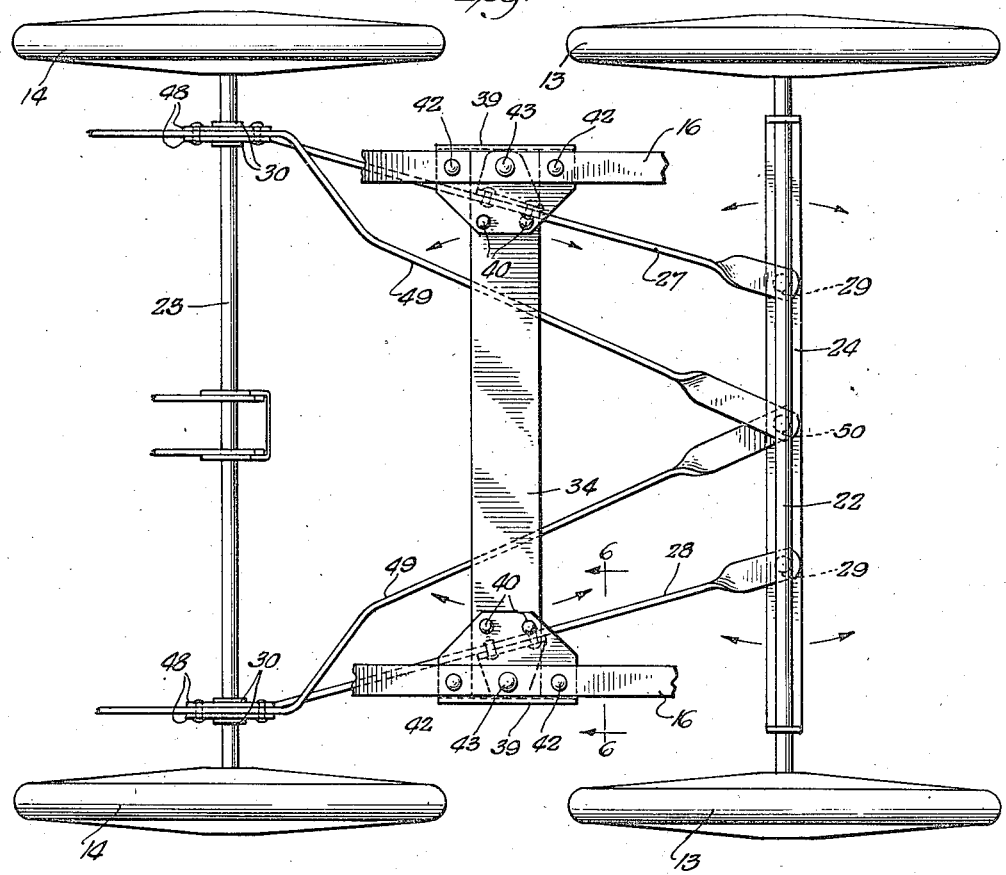
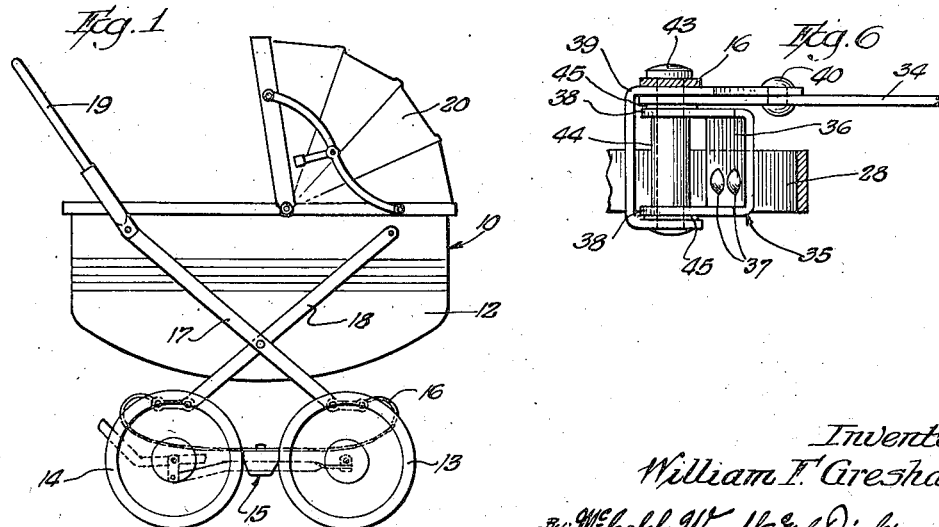
Inventor
William F. Gresham

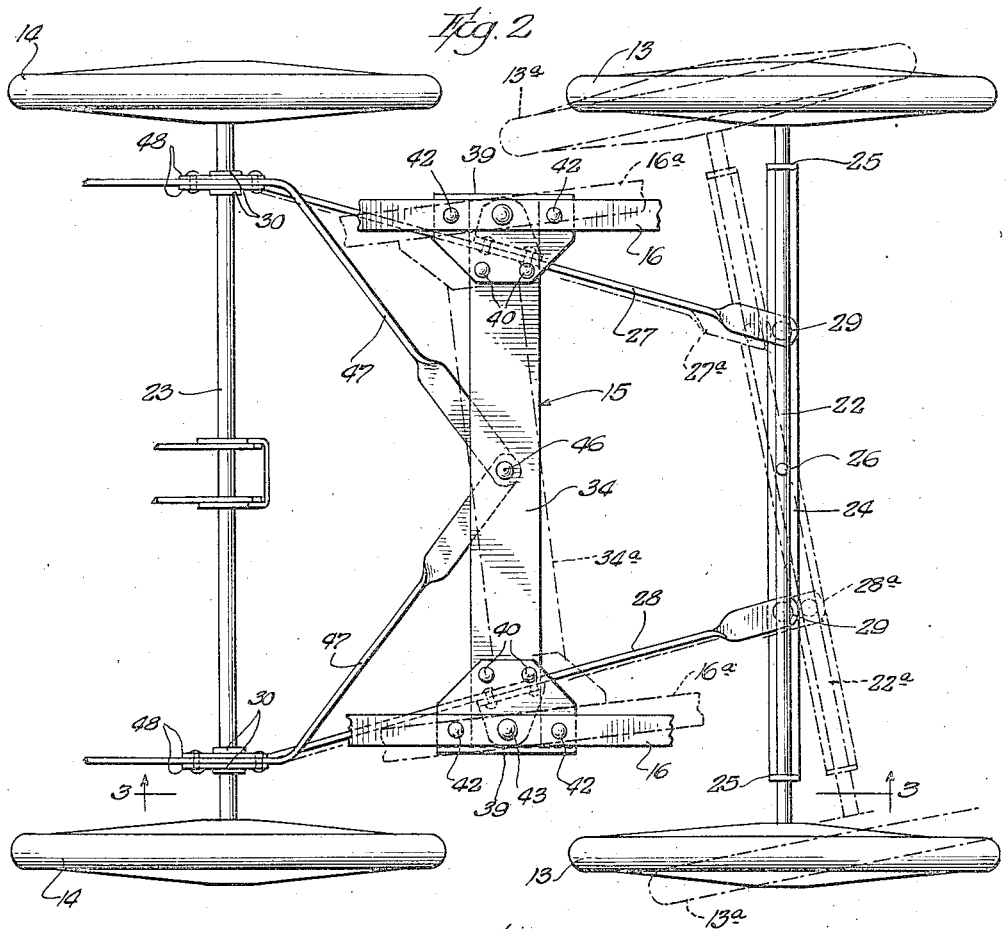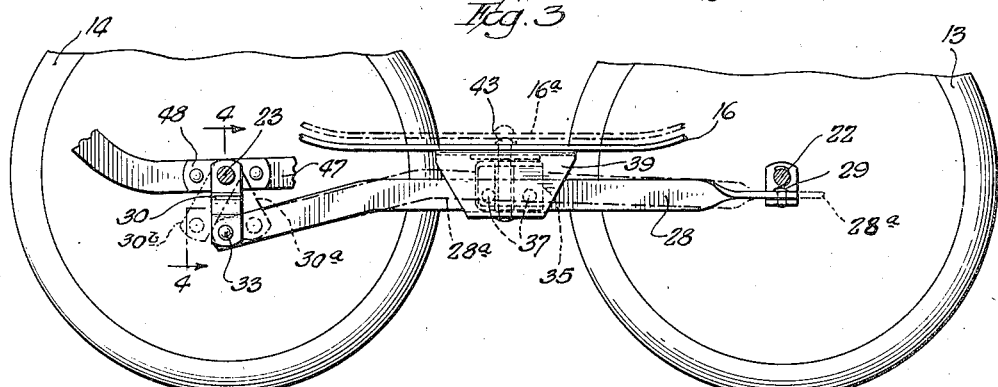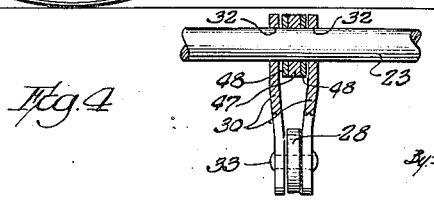

Patented Feb. 11, 1947

2,415,686

UNITED STATES PATENT OFFICE 2,415,686

BABY BUGGY AND THE LIKE

William F. Gresham, Chicago, Ill., assignor to Storkline Furniture Corporation, Chicago, Ill., a corporation of Illinois Application June 2, 1945, Serial No. 597,239

12 Claims. (Cl. 280—48)

This invention relates to baby buggies and the like, and more particularly to those of the type having an undercarriage which is steerable without raising the wheels from the ground.

It is a general object of the present invention to provide an improved baby buggy or the like having an undercarriage which is operable to turn one pair of wheels relative to the other as an incident to lateral thrust applied to the handle of the buggy.

The invention also has for an object the provision of a steerable baby buggy or the like having an improved undercarriage in which the wheels normally tend to return to their aligned positions after being turned.

As another object, this invention comprehends the provision of a steerable baby buggy or the like in which the undercarriage is so constructed and arranged that the weight of the buggy body and its contents is utilized to furnish a biasing force tending to hold the front and rear wheels in aligned relation.

An additional object of the invention is to provide an improved undercarriage for baby buggies and the like which, in addition to being steerable, also gives sturdy and stable support to the buggy.

These and other features, objects and advantages of my invention will appear from the following detailed description, wherein reference is made to the accompanying two sheets of drawings in which:

Fig. 1 is a side elevational view of one type of baby buggy embodying a preferred form of my present invention;

Fig. 2 is a top plan view of a preferred form of steerable undercarriage adapted to use in a baby buggy of the type shown in Fig. 1;

Fig. 3 is a side sectional view of the undercarriage shown in Fig. 2 with parts cut away to emphasize certain features of the invention and wherein the section is taken substantially on a line 3—3 of Fig. 2;

Fig. 4 is a fragmentary sectional view of a part of the preferred undercarriage structure with the section taken substantially on a line 4—4 of Fig. 3;

Fig. 5 is a top plan view similar to Fig. 2 but illustrating a modification of a part of the structure; and Fig. 6 is a fragmentary sectional view of a part of the structure common to the disclosures of Figs. 2 and 5 and wherein the section is taken substantially on a line 6—6 of Fig. 5.

In the exemplary illustration of my invention shown in Fig. 1 and illustrating its adaptation to baby buggies, a buggy 10 has a body 12 carried for wheeling movement on front and rear wheels 13 and 14, respectively. An undercarriage structure 15 connects the wheels 13 and 14 and supports the load of the body through longitudinally extending springs 16 which are secured to the undercarriage intermediate the front and rear wheels. Crossed and connected side support strips 17 and 18 have their lower ends connected to the ends of the springs 16 and their upper ends connected to the body. At one end of the body a handle 19 is connected thereto for pushing the buggy, and a collapsible top 20 is illustrated in its raised position at the end of the body opposite the handle.

To enable the person pushing the buggy to steer it by side thrust applied to the handle 19, rather than by raising either the front or rear wheels from the surface over which the buggy is being pushed, the present invention contemplates the provision of a steerable undercarriage. In the preferred form of steerable undercarriage shown in Fig. 2, the front and rear wheels 13 and 14, respectively, are rotatably mounted on the ends of front and rear axles 22 and 23. For normal straight forward movement of the buggy, the front and rear axles are substantially parallel and the front and rear wheels are substantially aligned or parallel.

In order to facilitate the securing of other parts of the undercarriage to the front axle 22, a substantially straight strap 24 has upturned ends 25 provided with suitable apertures through which the axle extends so that the mid-portion of the strap extends along the axle in closely spaced relationship thereto. Fastening means, such as a rivet 26, is provided to prevent movement of the strap along the axle.

Symmetrically disposed in non-parallel relationship on opposite sides of a longitudinal center line between the wheels, are similar longitudinally extending load carrying ties 27 and 28. As shown in Figs. 2 and 3, the front ends of the ties 27 and 28 are rotatably connected to the strap 24 by suitable means such as rivets 29. The positions of the ties along the strap 24 are spaced inwardly from the wheels 13 and equidistantly spaced outwardly from the longitudinal center line between the wheels. The rear ends of the ties 27 and 28 are supported from the rear axle 23 through links 30, as illustrated in Figs. 3 and 4. Each of the links 30 desirably comprises a pair of side straps having bores 32 through which the axle 23 extends, so that they are suspended or hanging downwardly from the axle. At their lower ends, the sidestraps are rotatably connected to the rear ends of the longitudinally extending ties 27 and 28 by means such as rivets 33.

In the preferred embodiment of my invention, the normal dimensions and positions of the parts are such that when the links 30 hang downwardly in the positions to which they normally gravitate, the axles 22 and 23 are parallel and the wheels 13 and 14 are in alignment or parallel. Since the longitudinally extending ties 27 and 28 are suspended from the rear axle through the links 30, they are movable relative to the rear axle in a direction longitudinal of the ties and transverse to the axle. The front ends of the ties being rotatably connected to the front axle 22 through the strap 24, the longitudinal movement of the ties relative to the rear axle 23 determines the relative positions of the axles.

Intermediate the front and rear axles 22 and 23 and desirably at a position near the mid-portions of the longitudinally extending ties 27 and 28, a cross member 34 is supported by the ties and has its end portions rotatably connected to the ties, as illustrated in Figs. 2, 3 and 6. In order to promote the stability of the structure, the rotatable connection of each end of the cross member 34 to one of the longitudinally extending ties is accomplished through the use of a yoke 35 having a web 36 secured to one of the straps 27 or 28 by fastening means such as rivets 37 and substantially parallel side portions 38 projecting outwardly from the side of the strap. An outer yoke 39, secured to each end portion of the cross member 34 by fastening means such as rivets 40, extends around the outer projecting ends of the side portions 38 of the yoke 35 and has secured thereto, by fastening means such as rivets 42, one of the springs 16 which resiliently supports the body 12 of the buggy. Thus, it may be understood that the weight of the body 12 is carried by the longitudinal ties 27 and 28 through the yoke 35. Aligned bores through the spring 16, cross member 34 and side portions of the yokes 39 and 35, accommodate a hinge pin 43 which establishes the rotatable connection between each outer spring support yoke 39, as well as each end of the cross member 34 and one of the ties. By preference, a spacing collar 44 is disposed upon the mid-portion of the hinge pin 43 intermediate the projecting side portions 38 of the yoke 35 and suitable washers 45 are disposed between the outer surfaces of the side portions of the yoke 35 and the adjacent cross member 34 and side portion of the yoke 39.

In the normal positions of the longitudinally extending ties 27 and 28 with the axles 22 and 23 parallel to one another, the cross member 34 is preferably parallel to the axles. Since both the cross member 34 and the front axle 22 are rotatably connected to the longitudinal ties 27 and 28, their relative positions are determined by the positions of the ties, while both may be turned relative to the rear axle 23.

In the preferred embodiment of the invention, which is disclosed in Fig. 2, an axis of turning movement for the cross member 34 is fixed and determined relative to the rear axle 23 by the rotatable connection thereof through fastening means such as a rivet 46 to the ends of two fixed ties 47. The fixed ties 47 extend outwardly in angular and symmetrical relation relative to the longitudinal center line between the wheels and have their outer end portions secured to the outer end portions of the axle 23. In my preferred embodiment, spacing and reenforcing straps 48 are riveted to the end portions of the fixed ties 47 and the axle 23 extends through aligned openings in the fixed ties and the straps 48.

By fixing an axis of rotary or swinging movement for the cross member 34 relative to the rear axle 23, and at the axis of the rivet 46 which is preferably in the center of the cross member, a practically fixed axis of turning movement is also established for the front axle 22 by virtue of the connections between the cross member and the front axle through the ties 27 and 28. It may now be understood that since the body of the buggy is carried by the longitudinal ties 27 and 28 through the springs 16 in a position of longitudinal alignment with the wheels 13 and 14 when the axles and cross member 34 are parallel, a turning movement of the body and cross member 34 as well as opposite longitudinal movements of the ties 27 and 28 may be effected by side thrust applied through the handle 19 of the buggy.

An exemplary illustration of the turning movement of the springs 16 and the cross member 34 as well as the resultant longitudinal movements of the ties 27 and 28 which may thus be effected, is indicated in Fig. 2, with the springs and cross member indicated in dot and dash lines at positions designated at 16a and 34a and the ties designated at 27a and 28a, respectively. Such movement of ties 27 and 28 longitudinally and in opposite directions in substantially equal amounts, as indicated in dot and dash lines at 27a and 28a turns the front wheels, as shown. Since the ties 27 and 28 are equidistantly spaced from the center of the axle 22, the substantially equal and opposite movements of the ties turns the axle about its center, to a position indicated in dotted lines at 22a, whereupon the wheels 13 assume positions indicated in dotted lines at 13a, which positions are angularly related to those of the rear wheels. For turning in the opposite direction, the opposite thrust is applied to the handle 19 of the buggy and the operation of the parts is similar although the directions of movement are reversed.

The links 30, by which the rear ends of the longitudinally extending ties 27 and 28 are suspended from the rear axle 23, permit the longitudinal movements of the ties by which the steering is accomplished without turning or shifting the rear axle 23 relative to its established relationship to the centers of movement of the cross member and front axle. However, the particularly desired function of the link connection of the ties 27 and 28 to the rear axle, is to establish an effective mechanism and biasing force tending to return the front wheels 13 to their normal positions of alignment or parallelism with the rear wheels after they have been turned from that normal position. The wheels being in alignment, with the links hanging normally from the rear axle in the positions to which they gravitate, the turning movement of the front wheels produced by the described equal and opposite longitudinal movement of the ties 27 and 28, also raises the rear ends of the ties, as illustrated at 28a in Fig. 3, on account of the arcuate movements of the links 30 in opposite directions to positions such as those indicated at 30a and 30b. Although the directions of movements of the ties are opposite, the arcuate movements of the links 30 are similar and the tendency is for both links to return to their normal positions of suspension. Since the raising of the ends of the ties 27 and 28 also raises the springs 16 and the body of the buggy, it may be understood that the weight of the body and its contents adds to the biasing force, tending to effect alignment of the wheels.

In the modified form of my undercarriage, illustrated in Fig. 5, the operation and construction of the parts and their relative relations, are very similar to those previously described, and like parts which perform similar functions are referred to by the same reference numerals as those previously used. In this form, however, fixed ties 49 are secured to the rear axle 23 in the same manner as the fixed ties 47 in Fig. 2, but instead of extending forwardly to the center of the cross member 34, they extend to the center of the front axle 22 and are rotatably connected to the strap 24 by means such as a rivet 50. By this relationship of parts, the center of turning movement of the front axle is definitely fixed relative to the rear axle, and the center of turning movement of the cross member 34 is practically fixed by virtue of the connections between the front axle and cross member through the longitudinally extending ties 27 and 28.

Longitudinal movements of the ties 27 and 28, in the structure of Fig. 5, is effected by side thrust applied to the handle 19 of the buggy and is transmitted through those ties to the front axle to turn that axle about its fixed and central axis of rotation. It may be noted in connection with the structure of Fig. 5, that except for the bracing and rigidifying effect of the cross member 34 it could be eliminated without altering the operation of the structure.

From the foregoing description of the preferred and modified forms of my invention, it may be understood that the disclosed baby buggy is easily steerable without raising the wheels from the surface over which they are operating. In addition to this, the structure of the steerable undercarriage is sturdy and stable. The stability of the buggy is enhanced by the turning of the body around a fixed axis to produce the turning movement of the wheels, as well as by the fact that in the required movements of the undercarriage parts, which effect the turning of the wheels, stable relationships of the relatively moved parts and their centers are maintained. The wheels being normally biased by the weight of the body and its contents to positions of alignment or parallelism, the buggy is easy to operate without conscious and continual effort toward determination of the desired path of movement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patents of the United States, is:

1. A baby buggy or the like including a body, springs through which the body is resiliently supported, a handle connected to the body, and an undercarriage having front and rear pairs of wheels rotatably mounted at the ends of front and rear axles and comprising longitudinally extending ties each having one end rotatably connected to the front axle at a predetermined distance from the center thereof intermediate said center and the front wheels, links rotatably suspended from the rear axle at positions near the rear wheels and each rotatably secured to and carrying the other end of one of said ties at a predetermined distance below the rear axle, the lengths of said ties being such that the front and rear wheels are aligned when said links hang in their normal suspended positions below the rear axle, a cross member rotatably connected near each end to the mid-portion of one of said ties, bracket means rotatably connecting said springs to the mid-portions of said ties for supporting the body, fixed ties secured to the end portions of the rear axle and rotatably connected to the center of said cross member to establish a center of swinging movement for said cross member whereby lateral thrust applied to said handle moves said ties longitudinally in opposite directions to swing said front axle and turn the front wheels relative to the rear wheels.

2. A baby buggy or the like including a body, springs through which the body is resiliently supported, a handle connected to the body, and an undercarriage having front and rear pairs of wheels rotatably mounted on the ends of front and rear axles and comprising longitudinally extending ties each having one end rotatably connected to the front axle at a predetermined distance outwardly from the center thereof, separate links each suspended at one end for swinging movement relative to the rear axle intermediate the rear wheels and each rotatably secured to and carrying the other end of one of said ties at a distance below the rear axle, a cross member rotatably connected at each end to the mid-portion of one of said ties and also having said springs fixedly secured to the ends thereof for supporting the body, said front and rear axles and said cross member being substantially parallel when said links are suspended normally, said front axle and said cross member each having fixed axes of turning movement, and one of said axes being determined by means connected to the rear axle so that turning force applied to said longitudinal ties from said handle effects movement of said cross member about its axis and said movement is transmitted to the front axle through the longitudinal ties.

3. A baby buggy or the like including a body, springs through which the body is resiliently supported, a handle connected to the body, and an undercarriage having front and rear pairs of wheels rotatably mounted on front and rear axles and comprising longitudinally extending ties each having one end rotatably connected to the front axle for movement about an axis transverse to that of the axle and spaced from the center of the axle, means connecting the other ends of said ties to the rear axle at separated positions and supporting said other ends for movement relative to the axle in a direction transverse to the axle, a cross member rotatably connected to the mid-portions of said ties and serving as a support to which said springs are secured for supporting the body, said front and rear axles and said cross member having normal positions of substantial parallelism, said front axle and said cross member having axes of turning movement relative to the rear axle, and one of said axes of turning movement being fixed relative to the rear axle so that turning movement of the cross member is transmitted to the front axle by resulting longitudinal movement of said ties.

4. A baby buggy or the like including a body, springs through which the body is resiliently supported, a handle connected to the body, and an undercarriage having front and rear pairs of wheels rotatably mounted on front and rear axles and comprising longitudinally extending ties each having one end rotatably connected to the front axle for movement about an axis transverse to that of the axle and spaced from the center of the axle, means connecting the other ends of said ties to the rear axle at separated positions and supporting said other ends for movement relative to the rear axle in a direction transverse to the axle, a cross member rotatably connected to the midportions of said ties and serving as a support to which said springs are secured for supporting the body, said front and rear axles and said cross member having normal positions of substantial parallelism, fixed tie strips rotatably connected to the center of the front axle and attached to the end portions of the rear axle to fix the axis of turning movement of the front axle relative to the rear axle whereby turning movement of the cross member effected by force applied to said handle turns the front axle about said axis of turning movement as a result of the connection of the cross member and front axle through said longitudinal ties.

5. In a baby buggy or the like having a body, a steerable undercarriage comprising, in combination, a pair of axles each having rotatably mounted thereon a pair of wheels, a pair of longitudinal ties symmetrically disposed with respect to a longitudinal center line between the wheels, one end each of said ties being rotatably connected to one of said axles, links rotatably hung from the other of said axles for swinging movement longitudinally of said ties and rotatably connected to the other ends of said ties at a distance below said other axle, the planes of said wheels being in substantial parallelism when said links hang normally below said other axle, means determining a center of turning movement for said one of the axles, and means exerting substantially equal and opposite forces longitudinally of said ties for swinging said links from their normal hanging positions and turning said one of the axles relative to the other.

6. In a baby buggy or the like, having a body, a steerable undercarriage comprising, in combination, a pair of axles each having rotatably mounted thereon a pair of wheels, non-parallel longitudinal ties connecting the axles, said ties each having an end rotatably connected to one of the axles, and the other end supported by the other axle for movement relative thereto longitudinally of the tie and transverse to said other axle, a cross member rotatably connected to each of said ties and adapted to support said body, said one of the axles and said cross member each having substantially central axes of turning movement, and means fixing the position of one of said axes relative to said other axle thereby to establish the position of the other axis.

7. In a steerable undercarriage for baby buggies and the like, the combination comprising a pair of axles each having mounted thereon a pair of wheels, a pair of longitudinally extending ties symmetrically disposed with respect to a longitudinal center line between the wheels, one end of each of said ties being rotatably connected to one of said axles, means connecting the other ends of said ties to the other of said axles and supporting said other ends of the ties for movement relative to the rear axle in a direction substantially longitudinal of the ties, and a pair of fixed ties connected at relatively fixed positions relative to the ends of said other of the axles and rotatably connected to the center of said one of the axles.

8. In a steerable undercarriage for baby buggies and the like, the combination comprising a pair of axles each having mounted thereon a pair of wheels, a pair of longitudinally extending ties symmetrically disposed with respect to a longitudinal center line between the wheels, one end of each of said ties being rotatably connected to one of said axles, means connecting the other ends of said ties to the other of said axles and supporting said other ends of the ties for movement relative to the rear axle in a direction substantially longitudinal of the ties, a cross member rotatably connected to the mid-portions of said ties, and a pair of fixed ties connected at relatively fixed positions relative to the ends of said other of the axles and rotatably connected to the center of said cross member.

9. In a steerable undercarriage for baby buggies and the like, the combination comprising a pair of axles each having mounted thereon a pair of wheels, a pair of longitudinally extending ties symmetrically disposed with respect to a longitudinal center line between the wheels, one end of each of said ties being rotatably connected to one of said axles, means connecting the other ends of said ties to the other of said axles and supporting said other ends of the ties for movement relative to the rear axle in a direction substantially longitudinal of the ties, a pair of yokes each having parallel side portions and a connecting web, each of said yokes having its connecting web secured to the mid-portion of one of said longitudinally extending ties so that said side portions project laterally therefrom, a load carrying cross member supported by said longitudinally extending ties, and means extending through said cross member and the side portions of said yokes for rotatably connecting the cross member to said longitudinally extending ties.

10. In a steerable undercarriage for baby buggies and the like, the combination comprising a pair of axles each having mounted thereon a pair of wheels, a pair of longitudinally extending ties symmetrically disposed with respect to a longitudinal center line between the wheels, one end of each of said ties being rotatably connected to one of said axles, means connecting the other ends of said ties to the other of said axles and supporting said other ends of the ties for movement relative to the rear axle in a direction substantially longitudinal of the ties, means determining the position of the center of said one of the axles with respect to the position of said other of the axles, and means normally biasing said one of the axles to a position substantially parallel to the other axle.

11. In a steerable undercarriage for baby buggies and the like, the combination comprising a pair of axle shafts, means determining the distance between the centers of said axle shafts, and one of said axle shafts being supported for turning movement relative to the other, load carrying ties flexibly connecting said shafts at positions spaced from the centers of the shafts, said ties including flexibly connected parts adjacent one of the shafts and so relatively disposed that the weight of said load biases the parts to normal positions, and means for applying force to said ties to overcome said biasing force and effect turning movement of said one of the shafts.

12. In a steerable undercarriage for baby buggies and the like, the combination comprising three parts having normal positions in substantially parallel relationship to one another and two of which are movable to non-parallel positions relative to the third, said parts including two axle shafts and a cross member, means connecting said third part to one of the movable parts to determine the position of the center of movement of said one of the movable parts, and means connecting said movable parts together so as to establish the center of movement of one relative to the other.

WILLIAM F. GRESHAM.